Jan. 28, 1947. P. SCHLUMBOHM 2,414,901
HANDLE FOR FLASK-NECKS
Filed Jan. 19, 1943
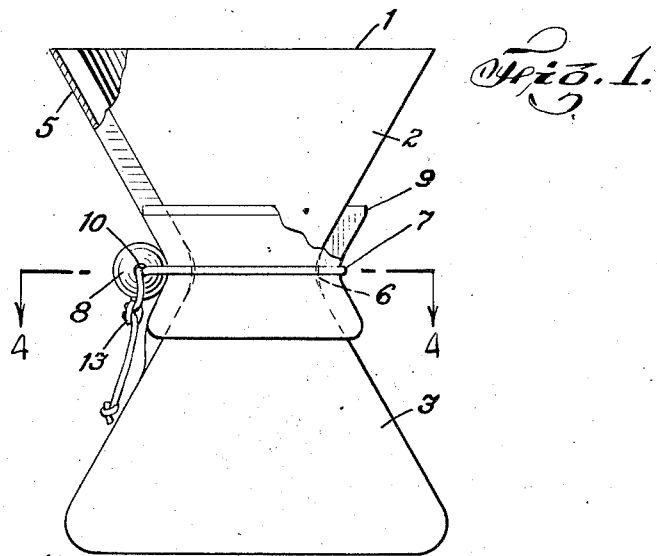
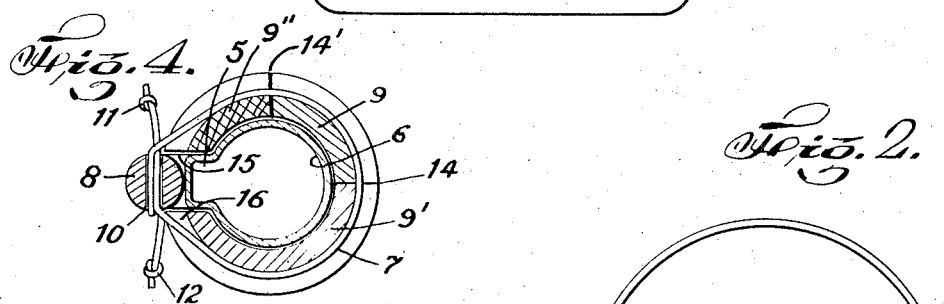
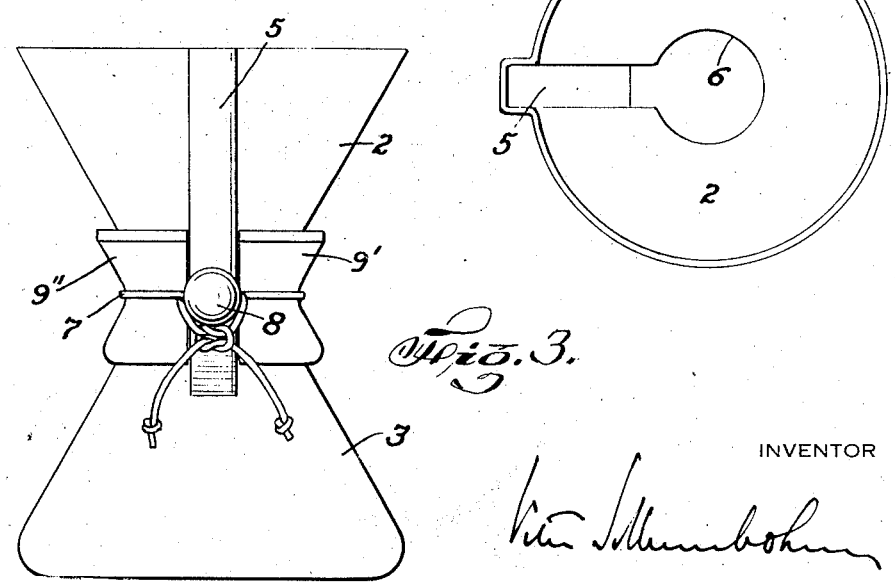
INVENTOR Patented Jan. 28, 1947

2,414,901

UNITED STATES PATENT OFFICE 2,414,901

HANDLE FOR FLASK-NECKS

Peter Schlumbohm, New York, N. Y.

Application January 19, 1943, Serial No. 472,847

1 Claim. (Cl. 215—100)

The present invention was made to solve the problem of finding a heat-insulating handle for a glass coffee maker, and the specific means developed for this application are shown in the accompanying drawing, Fig. 1–Fig. 4.

Fig. 1 is a side view of a glass flask with a detachable wooden handle, partly shown in side elevation and partly shown in section;

Fig. 2 is a top plan view of the glass flask;

Fig. 3 is a front elevation of the device shown in Fig. 1;

Fig. 4 is a sectional view taken on line 4—4 of Fig. 1.

The handle which I invented has proved so practical, that its application will not be limited to coffee-maker bowls, but will have general practicability for a flask which is suitable for a neck-grip.

Flasks, which are designed to be gripped by the neck, all have one feature in common: The neck constitutes a restriction in diameter not only computed on the diameter of the flask body below the neck, but also computed on the pouring mouth above the neck. The pouring mouth either has a thickened edge, or is flared, or has a protruding pouring lip or is funnel-shaped as in the example given in the drawing. In addition to the requirements which dictate a widening of the diameter of the flask-mouth over the diameter of the flask neck, there will also be the desire to create a restriction per se in the flask neck, so as to allow a better grip without slipping.

To provide a heat-insulating handle for such a flask has been done in the well known manner of weaving a basket-like structure around the neck of a laboratory-flask. Such basket technique is practically limited to handwork and its quality varies with the skill of the individual worker.

The invention applies a barrel-technique instead of the basket method. The handle is built up from segments, like a barrel is built up from staves. These stave-like segments are assembled on the neck of the flask and subsequently bound with a hoop or a loop to form an entity.

A further step is to make the handle with concave contours to follow the restriction of the neck. Following the invention, the zone of smallest diameter of the neck is also the zone of smallest diameter of the handle. This will let one single loop binding be sufficient to anchor the handle-staves in the neck-restriction.

In Fig. 1, the flask 1 has a flask-body proper 3, a funneled neck with a pronounced neck-restriction 6 and a funnel 2 serving in this special example the double purposes of a filter-funnel and a pouring mouth. The pouring is assisted by a groove 5. The handle is formed by at least two stave elements 9 and 9', which are bound into an entity by a loop 7, for instance from rawhide, the loop being bound off by a wood block element 8, for instance by a ball 8 with center hole 10.

As shown in Fig. 3, the stave elements leave a space free for the groove 5. This groove, more clearly shown in Fig. 2 thus forms a key to lock the stave elements against side-slip.

As illustrated in Fig. 4, there may be more than two stave elements, for instance three: 9, 9' and 9". While the separating cuts 14 and 14' between two neighbouring staves are directed radially, computed on the center of the neck restriction 6 or, better formulated, computed on the vertical axis of the flask, the cuts 15, 16 neighbouring the key-groove 5 are adapted to the angle of the walls of said groove, and in the example shown, the cuts 15, 16 are parallel cuts. When speaking of cuts, I refer to the method I applied for making the handle in wood. The handle was first turned as a complete spool and subsequently cut by the saw into the stave elements. However, this is not the only method feasible. There is even one consequence of this invention to build the handle up from staves, which leads very advantageously to applying plastics. It is simpler to make the multitude of small elements than to press one large piece of intricate design.

Having now described the nature of my invention and given examples of how it may be performed, I claim:

A handle and flask combination, said flask having a restricted neck and portions flared upwardly and outwardly from said neck, and outwardly and downwardly from said neck, and a projection on said neck extending from the top to the bottom thereof; said handle comprising a hand gripping means of heat insulating material built up completely about said neck with the exception of said projection, whereby said hand gripping means will be locked against upward or downward movement and locked against rotation about said neck.

PETER SCHLUMBOHM.